United States Patent [19]

Markus et al.

[11] Patent Number: 5,305,234
[45] Date of Patent: Apr. 19, 1994

[54] THERMAL PROTECTION APPARATUS FOR A SYNCHRONOUS MACHINE

[75] Inventors: David R. Markus, Monroeville; Kenneth M. Eichler, Murrysville, both of Pa.; Donald S. Kimmel, Fletcher, N.C.; Gerhard K. Kasprowicz, Ancaster; Robert S. Murray, Caledonia, both of Canada

[73] Assignee: Westinghouse Electric Corp., Pittsburgh, Pa.

[21] Appl. No.: 815,678

[22] Filed: Dec. 31, 1991

[51] Int. Cl.⁵ .................................. H02H 7/06
[52] U.S. Cl. .................................. 364/550; 364/483; 364/494; 361/20; 361/24; 361/25; 388/934
[58] Field of Search ............... 361/28, 29, 20, 21, 361/31, 24, 25; 318/634, 708, 717; 364/494, 550, 483; 388/907.5, 934, 903

[56] References Cited

U.S. PATENT DOCUMENTS

| | | | |
|---|---|---|---|
| 4,423,362 | 12/1983 | Konrad et al. | 388/934 |
| 4,476,423 | 10/1984 | Mallick, Jr. et al. | 361/29 |
| 4,717,985 | 1/1988 | Demeyer | 364/483 |
| 4,788,619 | 11/1988 | Ott et al. | 364/483 |
| 4,796,142 | 7/1989 | Libert | 364/483 |
| 4,967,304 | 10/1990 | Dougherty | 364/483 |
| 5,057,962 | 10/1991 | Alley et al. | 361/24 |
| 5,101,315 | 3/1992 | Ishikawa et al. | 364/483 |

Primary Examiner—Kevin J. Teska
Assistant Examiner—Jae H. Choi
Attorney, Agent, or Firm—M. J. Moran

[57] ABSTRACT

A synchronous machine is protected from closely spaced instances of excessive field current and an excessive volts/hertz ratio by a control system which models rotor and stator cooling to provide memory of recent periods of excessive heating. Maximum excitation limiting and volts/hertz ratio limiting modules in a microprocessor based automatic voltage regulator for the machine generate time delayed limit signals which override voltage feedback control when the respective parameters exceed threshold values. The limiters each increment a count when the associated threshold value is exceeded and generate the associated limit signal when a predetermined count is reached. The predetermined counts and the counting rates are selected such that the delay intervals are inversely proportional to the amount by which the threshold values are exceeded. The counts are decremented at a rate which models rotor and stator cooling when the respective parameters return below the threshold values. If another event occurs before the count reaches zero, the delay before limiting action is reinitiated is shortened by an amount related to the residual heating.

16 Claims, 5 Drawing Sheets

THERMAL PROTECTION APPARATUS FOR A SYNCHRONOUS MACHINE

BACKGROUND

1. Field of the Invention

This invention relates to apparatus for protecting a synchronous machine from thermal overloads by limiting excitation and volts/hertz. In particular, the invention is directed to providing such protection in response to closely spaced events using a microprocessor-based limiter.

2. Background Information

Large synchronous machines, such as generators used in power generation systems and the machines used to adjust the power factor in such systems, have a stator winding connected to the power system and a rotor, or field, winding which is excited by a dc exciter through slip rings. The rotating dc field produced by turning of the rotor generates an ac field in the stator winding. A voltage regulator attempts to regulate the stator voltage to a desired set point value in a feedback loop which regulates the field current. In the case of a small generator, or even a large generator in a very large power system, terminal voltage of a synchronous machine is set by the power system. If the system voltage becomes depressed, the voltage regulator on the machine attempts to raise the voltage by increasing the field current. This leads to overheating of the rotor and damage to the machine.

Conventionally, synchronous machines are protected by several limiters. A maximum excitation limiter protects the synchronous generating equipment against excessive field current, i.e., excitation. This limiter is typically part of, and acts through, the generator's automatic voltage regulation equipment. Under certain power system fault conditions, or as a result of malfunctions in auxiliary devices, the automatic voltage regulator may attempt to increase the generator field current to a point where rotor heating endangers the machine. Maximum excitation limiters monitor field current and will act to reduce field current under such circumstances; essentially overriding any other attempts to maintain or increase excitation. A time delay related to the degree of excessive excitation is applied before limiting action actually occurs.

Synchronous generating equipment is also routinely protected against excessive rotor flux densities by equipment known as a volts per hertz limiter. This limiter is typically also a subsystem of, and acts through, the generator's automatic voltage regulation equipment. During certain power system disturbances, or as a result of operator actions or malfunctions in auxiliary devices, the automatic voltage regulator may attempt to increase the generator excitation to a point where stator heating endangers the machine. Reduced speed (under frequency) operation requires that the machine excitation be decreased proportionally. Attempting to maintain nominal terminal voltage at under frequency conditions can result in excessive magnetic flux densities in both the generator stator core and in the core of the unit transformer. Excessive flux density results in hysteresis and eddy current losses and overheating of the magnetic material. Such situations may also occur during machine start-up where prolonged periods of underspeed operation are common. Volts Per Hertz (V/Hz) limiters will act to reduce excitation under such circumstances, essentially overriding any other attempts to maintain or increase excitation. Again, a time delay related to the degree of excessive excitation is applied before limiting action actually occurs. The degree of limiting action is proportional to a volts per hertz ratio in excess of a safe level.

These maximum excitation limiters and V/Hz limiters are effective at limiting excitation, but once the excitation returns to safe levels, the limiting action ceases. If the excitation again exceeds safe levels, the limiting algorithms simply reinitiate all time delay cycles. No knowledge of any preceding events is recognized by these known systems. In situations where such events are widely separated in time, the rotor or the magnetic material will have sufficient time to cool. However, if such events occur too closely spaced in time, the rotor or the magnetic material may not return to its normal temperature before the next event begins. The traditional implementation of these limiters reinitializes the delay timers at the end of each event with no allowance for the fact that the rotor or magnetic material is entering the next event at an already elevated temperature. Under these circumstances, the limiting action will not have the needed effect.

There is a need therefore, for improved protection of a synchronous machine. More particularly, there is a need for apparatus for protecting a synchronous machine from events closely spaced in time which can cause thermal damage to the machine.

Specifically, there is a need for improved apparatus for protecting a synchronous machine from over excitation and excess V/Hz events which occur close enough in time that the machine has not had time to cool to normal temperature before the next event occurs.

There is also a need for such improved apparatus which can operate through the existing voltage regulation system for synchronous machines.

There is a further need for such an improved apparatus in which the protection can accommodate for changes in the cooling rate of the machine following an event.

SUMMARY OF THE INVENTION

These and other needs are satisfied by the invention which is directed to apparatus for protecting a synchronous machine from overheating which includes a processor which compares the value of a selected electrical parameter to a thermal threshold value and generates a limiting signal when the value of the selected electrical parameter remains above the thermal threshold value for a time interval which is an inverse function of the amount by which the value of the parameter exceeds the threshold, and a direct function of the time required for cooling of the synchronous machine since the value of the electrical parameter previously exceeded the threshold value. This limiting signal is then used to adjust operation of the synchronous machine to correct the value of the selected electrical parameter below the thermal threshold value. In particular, the processor monitors the field current and the V/Hz ratio and models cooling of the rotor and stator respectively following occurrences of excessive field current and excessive flux densities so that if the machine has not had sufficient time to cool to normal temperature before another event occurs, the residual heat is taken into account in evaluation of the new event.

More particularly, the processor is a microprocessor which initiates a count when a threshold value of the field current or volts per hertz ratio is exceeded. When the count reaches a predetermined value, a limit signal is generated which acts through the voltage regulator system of the synchronous machine to reduce field current. The predetermined count and count rate are selected so that the delay interval before limiter action is an inverse function of the amount by which the field current or volts per hertz exceeds the threshold value. When the field current or volts per hertz ratio, falls below its threshold value, the count is decremented at a rate which mimics cooling of the rotor or stator. If a second event occurs before the count has counted down to zero, less time is needed before the count again reaches the predetermined value, so that limiting action is initiated earlier. If the time between events is sufficiently long, the count is counted down to zero, indicating that the machine has returned to normal temperature, and the count remains at zero awaiting the next event.

The rate at which the counts are decremented can be adjusted to reflect changes in the cooling rate of the rotor or stator. This can be done manually by an operator input, or automatically in response to a measurement of machine cooling such as, for example, the pressure or flow rate of coolant in the machine.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As previously mentioned, large synchronous machines, such as generators used in large electric power generation systems and machines used to control the power factor in such systems, are typically controlled by an automatic voltage regulation system. Terminal voltage of the machine is controlled in a feedback control loop through regulation of the field current. Normally, the terminal voltage of the machine is dictated by system voltage and regulation of the field current through the automatic voltage regulation system controls the flow of VARs (volt amperes reactive). Under certain circumstances, the terminal voltage is depressed, such as through a fault in the power system, or appears to be depressed such as through a failure in the voltage measurement system. The automatic voltage regulating system increases the field current in an attempt to correct the terminal voltage. This can lead to excessive field current which can cause overheating of the rotor.

Typically, the volts per hertz ratio (V/Hz) of the synchronous machine is controlled during start-up and shut-down to prevent excessive flux densities in the stator which can cause overheating of the magnetic material. Excessive V/Hz, and the resultant overheating, can also occur during under-frequency operation.

Figure 1:
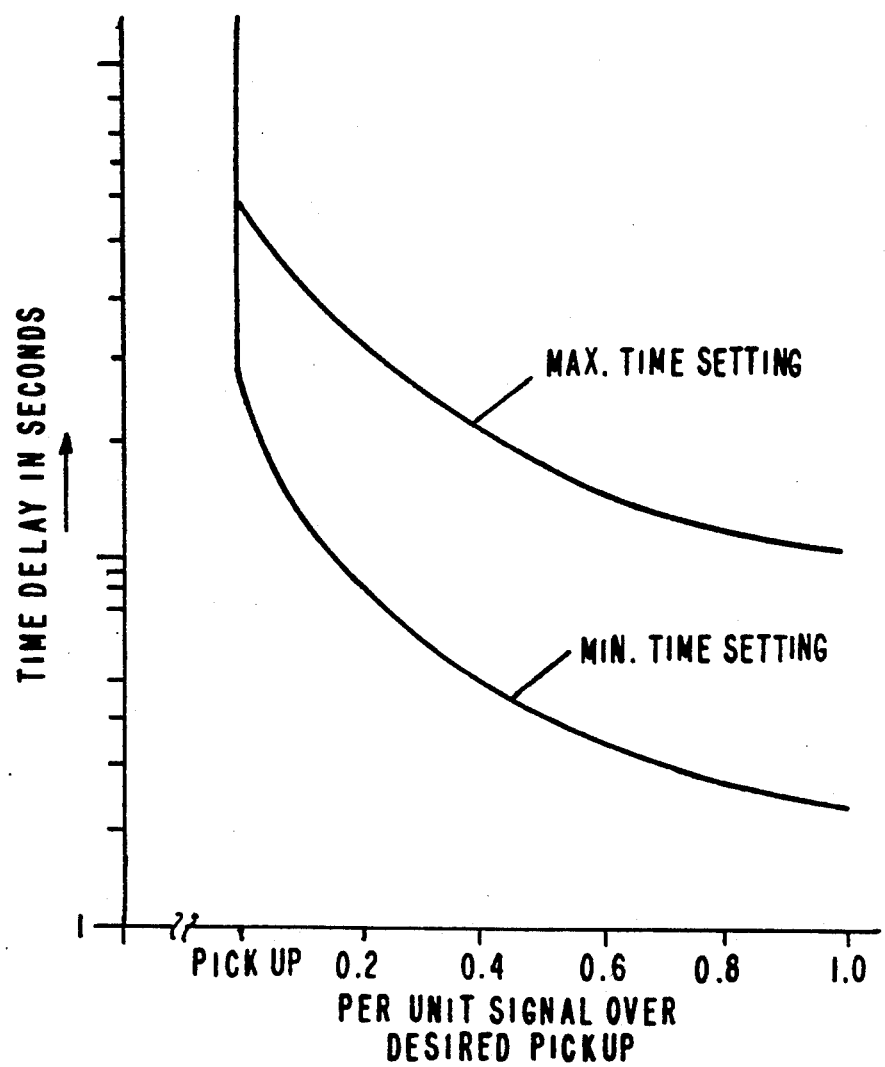
FIG. 1 illustrates a typical limiter curve family for a synchronous machine.

Typically, limiters are provided as part of the voltage regulation system to prevent excessive excitation and excessive V/Hz. A time delay related to the degree of excessive excitation or V/Hz is applied before limiting action actually occurs. FIG. 1 illustrates a typical limiter curve family. As can be seen, no limiting action occurs until the field current or V/Hz exceeds a "pick-up" or threshold value. The time delay is then related to the amount by which the pick-up value is exceeded. In the conventional automatic voltage regulation system for a synchronous machine, a single one of the family of curves is selected dependent upon the particular characteristics of the machine, that is, one curve is selected from the family of curves for the maximum excitation limiter, and another single curve is selected from the family of curves for the V/Hz limiter. No knowledge of any preceding events is recognized in these curves. Traditional limiters utilizing one of these curves reinitializes all delays when the monitored parameter returns to safe levels. When a second event occurs, the same curve is applied to the new event whether or not the machine has had an opportunity to return to normal temperature between events.

Figure 2:
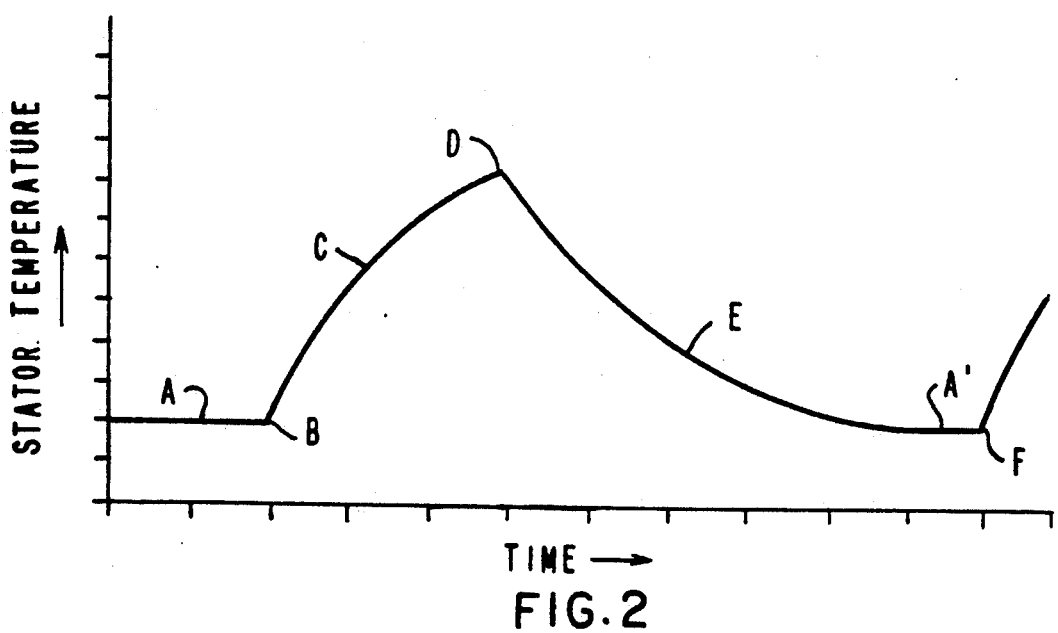
FIG. 2 is a plot of temperature versus time for widely spaced events which are caused by heating of a synchronous machine.
Figure 3:
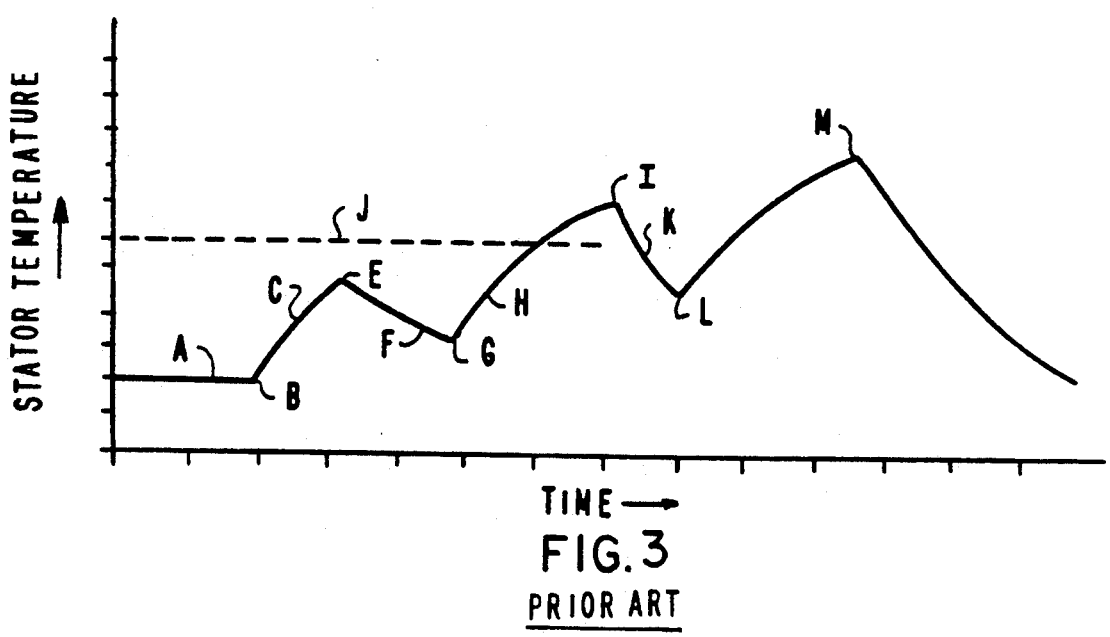
FIG. 3 is a plot of temperature versus time for closely spaced events for a synchronous machine controlled in accordance with the prior art.

FIGS. 2 and 3 more clearly illustrate the problem. These Figures plot temperature versus time for successive events. Similar plots apply for rotor temperature in the event of excessive excitation and stator temperature in the case of excessive V/Hz ratios. In FIGS. 2 and 3, A illustrates the normal temperature of the machine. When an event occurs at B which causes over excitation or excessive V/Hz, the temperature begins to rise along the trace C. At the end of the event D, when the monitored parameter returns to a safe value, the machine begins to cool along the characteristic E. FIG. 2 illustrates the situation where the temperature of the rotor or stator, has an opportunity to return the normal temperature at A before a second event occurs at F. Traditional limiters provide satisfactory protection under these circumstances.

FIG. 3, illustrates the circumstances where a second event begins at G before the temperature of the rotor or stator has had an opportunity to return to normal. Thus, the temperature is already elevated when the event begins. The traditional limiter does not recognize this situation and delays limiter action for the time interval established by the single curve selected from FIG. 1. Thus, the temperature rises at H to a point I which may exceed a danger level J. Assuming that the limiter effects corrective action and the excitation is returned to a safe level, cooling again occurs at K. But, if a third event occurs at L again before the temperature has had an opportunity to return to normal, the temperature again begins to rise from an elevated level before limiter action is taken at M. Such multiple closely spaced events could occur, for instance, where automatic equipment attempts to reclose a circuit breaker on a fault that is not cleared, or if an instability develops in the feedback control system that is regulating terminal voltage. Such instabilities could be oscillatory in nature, causing repeated periods of excessive excitation closely spaced in time.

The present invention includes a modification to the automatic voltage regulation system to include in the limiters a memory of preceding events. In essence, the limiters include a means of modeling the cooling down of the rotor and stator. The time delays before limiting action starts are not fixed by the delay curves. The delay curves become only the "nominal" delay times. The nominal curves reflect correct delay times only for events spaced far enough apart in time to permit complete rotor or stator cooling.

Figure 4:
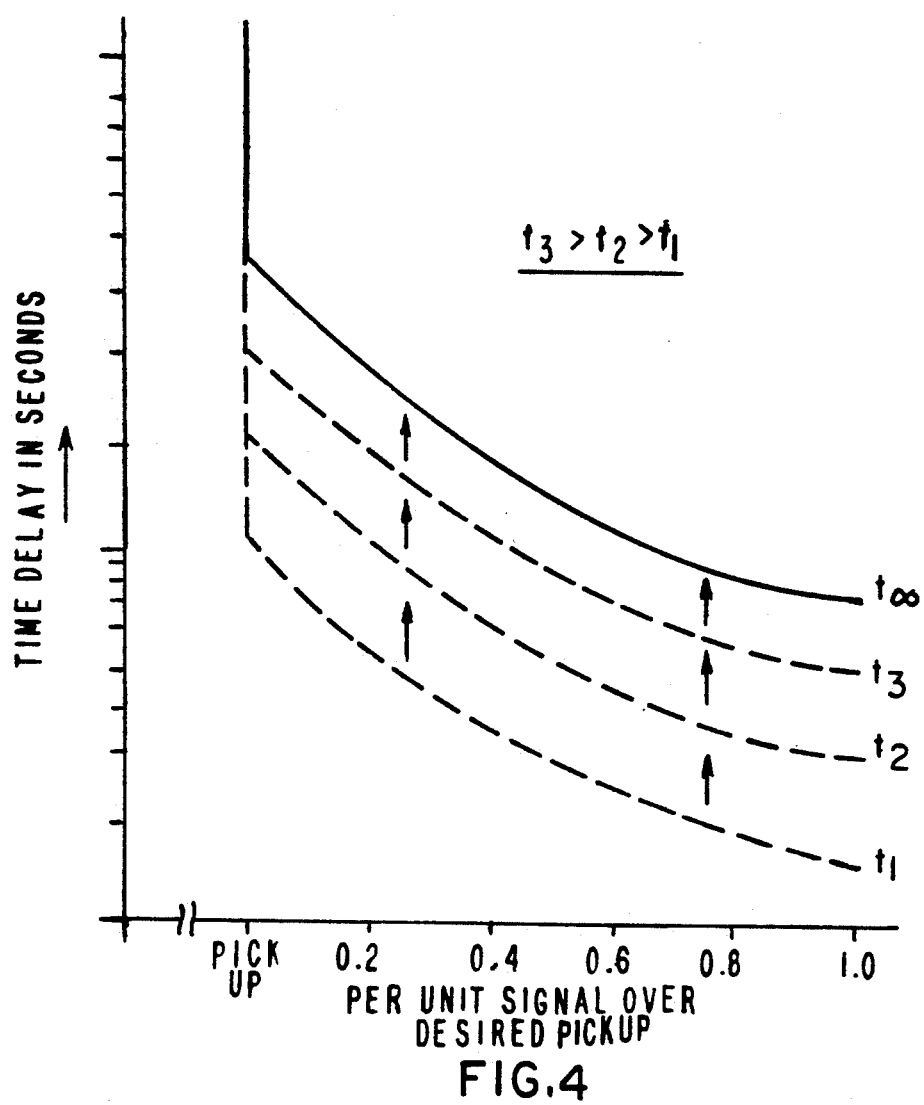
FIG. 4 is a plot illustrating the effect of the invention on the delay and limiter action.

Implementation of the invention can best be visualized as a downward shift of the nominal curve at the end of each event. This nominal curve is then allowed to rise at a predetermined rate until it returns to the nominal position. This rate of rise is a programmable parameter, and is selected to best model cooling. If events occur close together, the curve will not have returned to the nominal position. In this case, the time delay before the next limiter action will decrease. Since the rotor or stator will not have entirely cooled from the preceding event, the limiter will respond more quickly. FIG. 4 illustrates the nominal curve position identified by a time of $T_\infty$. The curves drawn in dashed lines exemplify the shift of the nominal curve at several time intervals after the conclusion of the first event. Thus, the curve is at the lowest position $t_1$ when the monitored parameter first returns to a safe value and rises at $t_2$ and $t_3$ and eventually, when the machine has returned to normal temperature, returns to the nominal curve position $t_\infty$. Clearly, if a second event occurs at the times $t_1$, $t_2$ or $t_3$, or any intermediate time, the delay interval before limiting action is initiated will be shorter for the same magnitude of over excitation or excessive V/Hz.

The preferred implementation of the invention does not involve translation of the nominal curve per se, but rather comprises manipulation of a delay timer.

Figure 5:
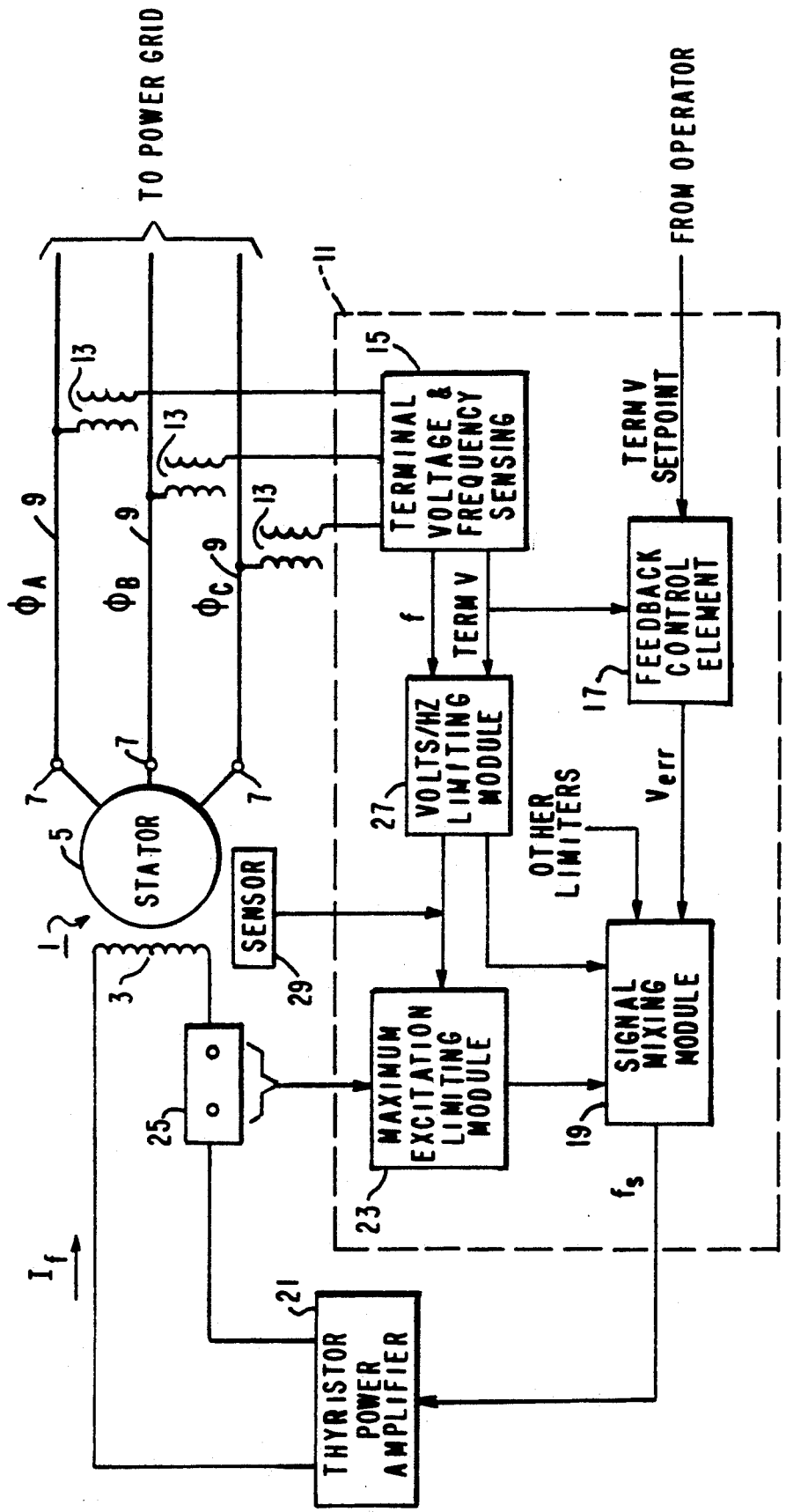
FIG. 5 is a schematic diagram in block form of a system in accordance with the invention for controlling a synchronous machine.

FIG. 5 illustrates a control system for a synchronous generator 1 incorporating the invention. The synchronous generator 1 includes a field winding 3 on a rotor which is driven by a prime mover (not shown). The stator 5 of the synchronous machine 1 has a winding which generates three-phase, power $\phi_A$, $\phi_B$ and $\phi_C$ at the terminals 7. This three-phase a power is connected to a power grid by leads 9.

The synchronous generator 1 is controlled by an automatic voltage regulator 11 which in accordance with the invention is implemented by a microprocessor. Potential transformers 13 monitor the three-phase voltage generated by the synchronous machine 1. A terminal voltage and frequency sensing module 15 within the voltage regulator 11 generates a terminal voltage signal, term v, and a frequency signal, f, from the outputs of the potential transformers 13. A feedback control element 17 generates an error signal, $V_{err}$ between a terminal voltage setpoint signal provided by an operator and the terminal voltage feedback signal, term v, obtained from the potential transformers. A signal mixing module 19 applies several limits to the terminal voltage error signal, $V_{err}$, generated by the feedback control element 17 and applies a resultant firing signal, $f_s$, to a thyristor power amplifier 21 which provides dc exciter current $I_f$ to the field winding 3.

The signal module 19 applies limits to the excitation level and the V/Hz ratio, in addition to other limits such as underexcitation or overvoltage. The maximum excitation limit is provided by a maximum excitation limiting module 23 within the automatic voltage regulator 11. A field current transducer 25 provides a measure of the field, or exciter current, to the maximum excitation limiting module 23.

A V/Hz limiting module 27 uses the frequency signal, f, and terminal voltage signal, term v, generated by the terminal voltage and frequency sensing module 15 to generate a V/Hz limit signal which is also applied to the signal mixing module 19.

The signal mixing module 19 selects the smallest of the terminal voltage error signal from the feedback control element 17 and the various limiter signals as the firing signal which is applied to the thyristor power amplifier 21. Thus, for instance, in the case where the voltage at the stator terminals 7 is depressed, such as by a fault in the power grid, so that the terminal voltage error signal becomes very large thereby increasing the field current above the permissible peak value, the maximum excitation limiting module will generate a limit signal which will override the terminal voltage error signal and reduce the field current to a safe level. Similarly, excessive V/Hz, for instance during start-up, will produce a limiting signal which will override the terminal voltage error signal and reduce the field current which in turn will reduce the flux density in the stator to a safe level.

The synchronous machine is typically cooled by circulation of a pressurized coolant through the machine. In accordance with the invention, a sensor 29 provides a signal to the maximum excitation limiting module 23 and the V/Hz limiting module 27 representative of the effectiveness of the coolant system, which as will be seen, is used by the limiters to adjust the generation of the limiting signals based upon the cooling of the machine. Typically, the sensor 29 would measure the pressure of the coolant.

Figure 6:
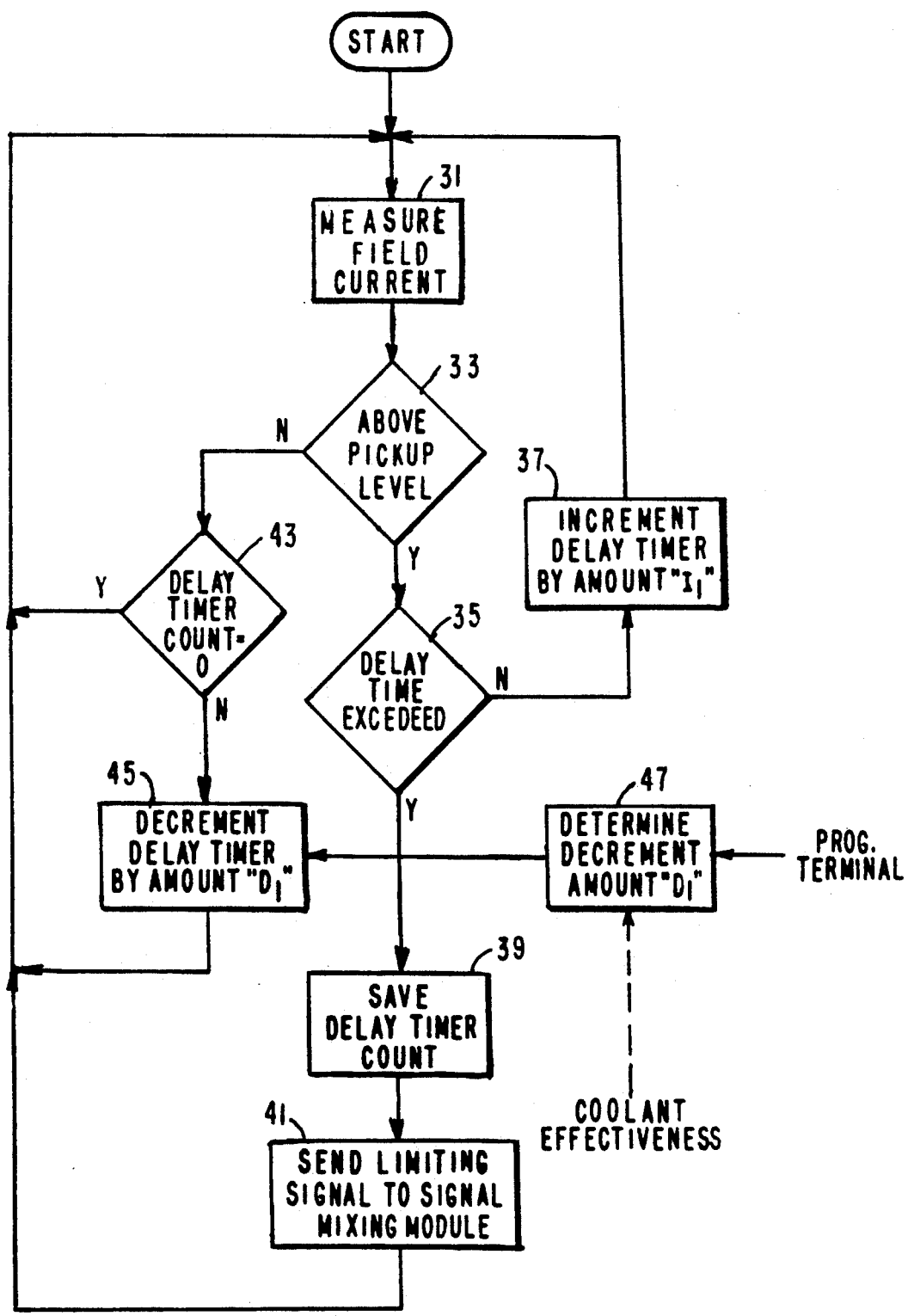
FIG. 6 is a flow chart of a computer program suitable for implementing maximum excitation limiter action in accordance with the invention.

A flow chart of a suitable program for the microprocessor based voltage regulator 11 to implement the maximum excitation limiting module 23 is illustrated in FIG. 6. At timed intervals determined by an interrupt, the field current as sensed by the transducer 25, is read at 31. This field current measurement is compared with the threshold or pick-up level of the field current at 33. If the field current exceeds the pick-up level, a determination is made at 35 if the delay time as been exceeded. The delay time is determined from the amount by which the field current exceeds the pick-up level using the nominal curve, $t_\infty$, of FIG. 4. If the delay time is not exceeded, a delay timer is incremented by amount $I_1$ at 37. The delay time and the amount $I_1$ by which the delay timer is incremented are determined by the nominal curve of FIG. 4. In the exemplary embodiment of the invention, the delay time is determined by a fixed delay count and the increment $I_1$ by which the count is incremented on each cycle is a function of the amount by which the measured field current exceeds the peak value. Alternatively, the increment $I_1$ can be fixed, and the total count can be adjusted as a function of the amount by which the measured field current exceeds the peak value. In either case, the delay interval is an inverse function of the amount by which the actual field current exceeds the peak value.

On subsequent cycles for which the measured field current exceeds the pickup level at 33, the delay timer is incremented in the loop described above. When the delay time is exceeded, as determined at 35, the delay timer count is saved at 39 and a limiting signal is sent to the signal mixing module 19 at 41. As long as the measured field current remains above the pick-up level, the delay timer count is saved and a limit signal is sent to a signal mixing module. As mentioned previously, this limit signal will override the terminal voltage error signal and control the thyristor power amplifier 21 to decrease the field current. When the field current again drops below the pick-up level as determined at 33, the delay timer count is checked at 43. If the count is not zero, it is decremented at 45 by an amount $D_1$. The amount $D_1$ by which the delay timer is decremented is selected to mimic rotor cooling with the field current below the pick-up level. This cooling rate $D_1$ is set at 47 in response to the signal generated by the cooling sensor 29 which monitors the coolant system effectiveness, or by a manual input entered by the operator from a programming terminal. The delay timer is decremented on subsequent cycles until the count reaches zero where it is maintained until the next event. Should the measured field current again exceed the peak value before the delay timer count has decremented to zero, indicating that residual excessive heat remains in the rotor, the count will begin incrementing again from the remaining value. Thus, it is clear that the delay time will be shorter for the second event resulting in quicker limiting action.

Figure 7:
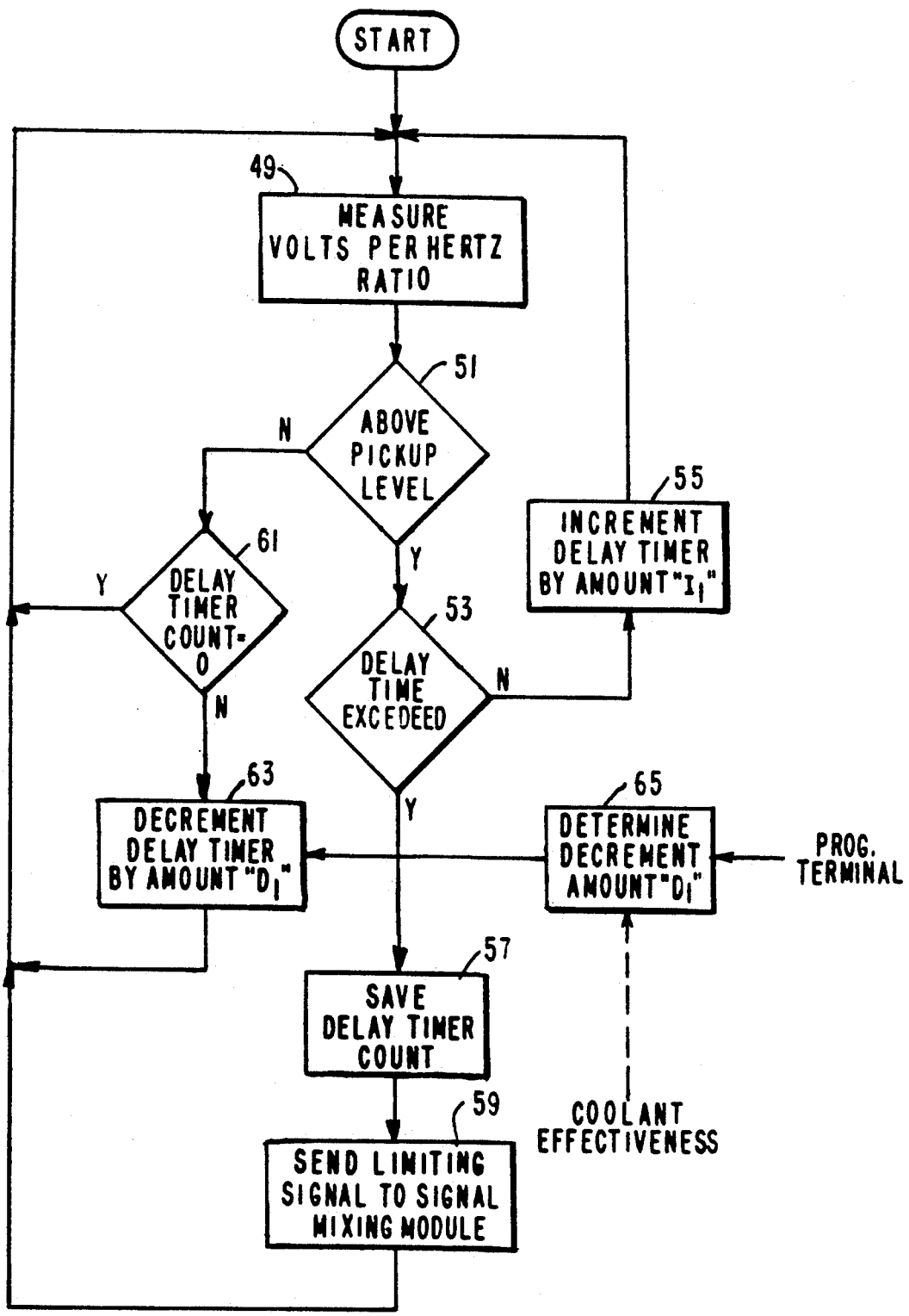
FIG. 7 is a flow chart of a computer program suitable for implementing V/Hz limiter action in accordance with the invention.

FIG. 7 is a flow chart of a suitable computer program for implementing the V/Hz limiting module 27 in the microprocessor based automatic voltage regulator 11. This program is similar to the program for the maximum field current in that periodically the V/Hz ratio is generated at 49 from the frequency and terminal voltage signal generated by the terminal voltage and frequency sensing module 15. If the V/Hz ratio is above the pick-up level as determined at 51, and the delay time has not been exceeded at 53, a loop is entered which increments the delay timer by an amount $I_1$ at 55. Again, the delay interval is an inverse function of the amount by which the calculated V/Hz ratio exceeds the peak value, and this can be established either by having a fixed trip count for the delay timer with a variable increment $I_1$, or incrementing the count at a fixed increment $I_1$ and varying the trip count. In either case, the interval is selected as an inverse function of the amount by which the measured value exceeds the peak value from the nominal curve of FIG. 4.

When the delay time is exceeded, as determined at 53, the delay timer count is saved at 57 and the limiting signal is sent to the signal mixing module 19 at 59. When the V/Hz ratio drops below the pick-up level, the delay timer count is decremented at 63 until it reaches zero as determined at 61. The amount $D_1$ by which the delay timer is decremented is selected to represent the rate of cooling of the stator. Again, this can be automatically set at 65 in response to the effectiveness of the coolant system as reported by the cooling sensor 29, or by a manual signal entered by the operator through a programming terminal. If another event occurs before the magnetic material cools completely, the delay timer will not have fully decremented. The delay timer count will then begin to increment from a non-zero "bias" count, resulting in faster limiting action.

This invention incorporates improved protection capability of the maximum excitation limiting equipment and V/Hz limiting equipment particularly found in automatic voltage regulation equipment for synchronous machines. This system considers the effects of residual rotor heating and magnetic material residual heat. Accounting for these effects leads to better protection strategies. The invention also takes into account any loss of effectiveness of the cooling media in modeling the cool-down rate of the rotor and the magnetic material.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for protecting a synchronous machine from overheating, said apparatus comprising:
   means measuring the value of a selected electrical parameter of said synchronous machine;
   processor means comparing the value of said selected electrical parameter to a thermal threshold value, and generating a limit signal when the value of said selected electrical parameter remains above said thermal threshold value for a time interval, said time interval being an inverse function of an amount by which the value of said selected electrical parameter exceeds said thermal threshold value, said time interval also being a direct function of time representative of cooling of said synchronous machine since the value of said selected electrical parameter previously exceeded said thermal threshold value; and
   means responsive to the limit signal to adjust operation of said synchronous machine to correct the value of said selected electrical parameter below said thermal threshold, in order that said synchronous machine continues operation at a safe level of said selected electrical parameter.

2. The apparatus of claim 1 wherein said processor means includes modifying means for modifying said direct function of time representative of said cooling of the synchronous machine to reflect acquired changes in cooling effectiveness.

3. The apparatus of claim 2 including means monitoring cooling of the synchronous machine and wherein said modifying means includes means responsive to said monitoring means to modify said direct function of time representative of cooling of the synchronous machine.

4. The apparatus of claim 1 wherein said selected electrical parameter is field current.

5. The apparatus of claim 4 wherein said means responsive to said limit signal comprises automatic voltage regulator means, said regulator means having means generating an error signal between machine terminal voltage and a setpoint voltage signal, said regulator means also having means selecting the smaller of said error signal and said limit signal as a control signal, and said regulator means also having means responsive to said control signal controlling machine field current.

6. The apparatus of claim 1 wherein said selected electrical parameter is a volts per hertz ratio.

7. The apparatus of claim 6 wherein said means responsive to said limit signal comprises automatic voltage regulator means having means generating an error signal between machine terminal voltage and a setpoint voltage signal, means selecting the smaller of said error signal and limit signal as a control signal, and means responsive to said control signal controlling machine field current.

8. The apparatus of claim 1 wherein said processor means comprises a digital processor including means comparing the value of said selected electrical parameter to said thermal threshold value and means generating a count at a selected count rate when the value of a selected electrical parameter exceeds said thermal threshold value, means generating said limit signal when the count reaches a predetermined value, said predetermined value of said count and selected counting rate being selected such that the time interval for the count to reach said predetermined count is an inverse function of the amount by which the value of said selected electrical parameter exceeds said thermal threshold value, and means decrementing said count at a rate representative of cooling of said synchronous machine when the value of said selected electrical parameter falls below said thermal threshold value.

9. The apparatus of claim 8 wherein said predetermined count is fixed, and wherein said selected counting rate is selected as a direct function of the amount by which the value of a selected electrical parameter exceeds said thermal threshold value.

10. The apparatus of claim 8 wherein said means decrementing said count includes means adjusting the rate at which said count is decremented to accommodate for acquired changes in cooling efficiency of the synchronous machine.

11. Apparatus for protecting a synchronous machine from rotor thermal damage due to excessive field current, said apparatus comprising:
    means measuring said field current;
    microprocessor means including means generating a digital field current signal from said measured field current, means comparing said digital field current signal to a field current threshold value, means incrementing a count at a selected rate each time the field current exceeds the field current threshold value, means generating a limit signal when said count reaches a predetermined value, said predetermined value of said count and said selected rate being selected such that said limit signal is generated in a time interval which is inversely proportional to the amount by which the field current exceeds the field current threshold value, and means decrementing said count toward, but not below a base value at a rate representative of rotor cooling when said field current signal falls below said field current threshold value; and
    means controlling the field current of said synchronous machine to adjust operation of said synchronous machine including means responsive to said limit signal to bring said field current below said field current threshold value, in order that said synchronous machine continues operation at a safe level of said field current.

12. The apparatus of claim 11 wherein said predetermined count is a fixed count and said selected counting rate at which said count is incremented is selected as a direct function of the amount by which said field current signal exceeds said field current threshold.

13. The apparatus of claim 11 wherein said means decrementing said count includes means modifying the rate at which said count is decremented to adjust for acquired changes in cooling effectiveness in said synchronous machine.

14. Apparatus for protecting a synchronous machine from stator thermal damage due to excessive V/Hz, said apparatus comprising:
    means measuring terminal voltage on said synchronous machine;
    microprocessor means including means generating from said measured voltage, a V/Hz ratio signal, means comparing said V/Hz ratio signal to a V/Hz ratio threshold value, means incrementing a count at a selected rate each time said V/Hz ratio signal exceeds said V/Hz ratio threshold value, means generating a limit signal when said count reaches a predetermined value, said predetermined value of said count and said selected rate being selected such that said limit signal is generated in a time interval which is inversely proportional to the amount by which said V/Hz ratio signal exceeds said V/Hz ratio threshold value, means decrementing said count toward, but not below a base value at a rate representative of stator cooling when said V/Hz ratio signal falls below said V/Hz ratio threshold value; and
    means controlling field current of said synchronous machine to adjust operation of said synchronous machine including means responsive to said limit signal to limit said field current to a value which brings said V/Hz ratio signal below said V/Hz ratio threshold value, in order that said synchronous machine continues operation at a safe level of flux density in said stator.

15. The apparatus of claim 14 wherein said predetermined count is a fixed count and said selected counting rate at which said count is incremented is selected as a direct function of the amount by which said V/Hz ratio signal exceeds said V/Hz ratio threshold value.

16. The apparatus of claim 14 wherein said means decrementing said count includes means modifying the rate at which said count is decremented to adjust for acquired changes in cooling efficiency of said synchronous machine.

* * * * *